United States Patent
Sasaki et al.

(10) Patent No.: US 9,260,585 B2
(45) Date of Patent: Feb. 16, 2016

(54) REINFORCED POLYAMIDE RESIN PELLET

(75) Inventors: Yukiyoshi Sasaki, Chiyoda-ku (JP); Tetsuo Kurihara, Chiyoda-ku (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 0 days.

(21) Appl. No.: 14/122,441

(22) PCT Filed: May 23, 2012

(86) PCT No.: PCT/JP2012/063183
§ 371 (c)(1),
(2), (4) Date: Jan. 29, 2014

(87) PCT Pub. No.: WO2012/165258
PCT Pub. Date: Dec. 6, 2012

(65) Prior Publication Data
US 2014/0135441 A1    May 15, 2014

(30) Foreign Application Priority Data

May 27, 2011    (JP) ................................. 2011-118723

(51) Int. Cl.
| | | |
|---|---|---|
| C08K 7/14 | (2006.01) |
| C08K 3/34 | (2006.01) |
| C08K 7/10 | (2006.01) |
| C08G 69/26 | (2006.01) |
| C08G 69/36 | (2006.01) |
| C08L 77/06 | (2006.01) |
| C08K 7/04 | (2006.01) |
| C08K 3/30 | (2006.01) |

(52) U.S. Cl.
CPC . *C08K 3/34* (2013.01); *C08G 69/26* (2013.01); *C08G 69/265* (2013.01); *C08G 69/36* (2013.01); *C08K 3/346* (2013.01); *C08K 7/10* (2013.01); *C08K 7/14* (2013.01); *C08L 77/06* (2013.01); *C08K 7/04* (2013.01); *C08K 2003/3009* (2013.01)

(58) Field of Classification Search
CPC ...... C08G 69/26; C08G 69/36; C08G 69/265; C08K 7/04; C08K 7/10; C08K 7/14; C08K 2003/3009; C08K 3/00; C08K 3/34; C08L 77/06
USPC ......... 524/417, 420, 423, 425, 447, 449, 451, 524/456, 494
See application file for complete search history.

(56) References Cited

U.S. PATENT DOCUMENTS

| | | | |
|---|---|---|---|
| 4,785,031 A | 11/1988 | Scarso | |
| 2002/0115818 A1 | 8/2002 | Ogo et al. | |
| 2003/0119999 A1 | 6/2003 | Kawano | |
| 2004/0082729 A1 | 4/2004 | Terada et al. | |
| 2005/0199859 A1 | 9/2005 | Terada et al. | |
| 2006/0014904 A1* | 1/2006 | Oka et al. ........................ | 525/199 |
| 2006/0197246 A1* | 9/2006 | Hale et al. ..................... | 264/37.3 |
| 2010/0155673 A1 | 6/2010 | Noda et al. | |
| 2011/0196080 A1* | 8/2011 | Matsuoka et al. ............. | 524/210 |
| 2012/0088110 A1* | 4/2012 | Elia et al. ...................... | 428/458 |

FOREIGN PATENT DOCUMENTS

| | | |
|---|---|---|
| EP | 2080788 A1 | 7/2009 |
| JP | 62-1734 A | 1/1987 |
| JP | 11-129246 A | 5/1999 |
| JP | 2000-167827 A | 6/2000 |
| JP | 2002-249568 A | 1/2002 |
| JP | 2002-249598 A | 9/2002 |
| JP | 2002-265623 A | 9/2002 |
| JP | 2003-165847 A | 6/2003 |
| JP | 2008-133465 A | 6/2006 |
| JP | 2007-92058 A | 4/2007 |
| JP | 2009-270057 A | 11/2009 |
| WO | 2004/060980 A1 | 7/2004 |

OTHER PUBLICATIONS

Search Report from International Application No. PCT/JP2012/063183, mail date is Aug. 21, 2012.
European Search Report issued with respect to application No. 12792506.3, mail date is Sep. 17, 2014.

* cited by examiner

*Primary Examiner* — Randy Gulakowski
*Assistant Examiner* — Christopher M Rodd
(74) *Attorney, Agent, or Firm* — Greenblum & Bernstein, P.L.C.

(57) ABSTRACT

(Problem to be Solved)
There is provided a reinforced polyamide resin pellet that is excellent in plasticization time stabilization properties during molding and molding appearance stability under molding conditions in long-term continuous molding.
(Solution)
A reinforced polyamide resin pellet comprising:
(A) a polyamide resin having a melting point of 200 to 270° C.; and
(B) at least one inorganic filler selected from the group consisting of chopped strand glass fibers, carbon fibers, wollastonite, talc, mica, kaolin, barium sulfate, calcium carbonate, apatite, sodium phosphate, fluorite, silicon nitride, potassium titanate, and molybdenum disulfide, and
wherein the pellet has a length of 1 to 5 mm and a ratio of a cross-sectional major axis to minor axis (major axis/minor axis) of 1.3 to 2.5.

9 Claims, No Drawings

REINFORCED POLYAMIDE RESIN PELLET

TECHNICAL FIELD

The present invention relates to a reinforced polyamide resin pellet.

BACKGROUND ART

Polyamide resins have been conventionally widely used as various component materials for clothing, industrial material, automobile, electrical and electronic, or industrial use or the like, because of excellent molding processability, mechanical properties, and chemical resistance.

In recent years, in molded articles using polyamide resins, continuous molding may be performed on a long-term basis under molding conditions in which the molding cycle is shortened, in order to improve productivity.

In such long-term continuous molding of polyamide resins, high plasticization time stability during molding is important. If this plasticization time varies, variations in the dimensions and appearance properties of the molded articles increase, which may greatly affect productivity.

Particularly, when reinforced polyamide resins reinforced with inorganic fillers and the like are molded, plasticization stability greatly affects the stability of molded article appearance.

Therefore, under the present circumstances, particularly, polyamide resins that are excellent in plasticization time stability in performing long-term continuous molding as described above, and further excellent in the stability of molded article appearance are demanded.

In order to meet such a demand for an improvement in the plasticization time stability of resins in performing long-term continuous molding, glass reinforced long fiber materials comprising polyolefin resins in which the pellet shape is defined (for example, see Patent Document 1), and glass-reinforced materials comprising polyamide resins having a melting point of 280° C. or higher and lower than 330° C. in which the pellet shape is defined (for example, see Patent Document 2) are disclosed as materials that can promote the shortening of plasticization time and reduce variations in the mass of products.

LIST OF THE PRIOR ART DOCUMENTS

Patent Documents

Patent Document 1: Japanese Patent Laid-Open No. 11-129246
Patent Document 2: Japanese Patent Laid-Open No. 2002-249568

SUMMARY OF INVENTION

The Problems to be Solved

However, in the materials disclosed in the above Patent Documents 1 and 2, although an effect can be seen in the plasticization time stability of molded articles under molding conditions in a short time, problems are that under molding conditions in long-term continuous molding, the plasticization time stability is insufficient, and there is still room for improvement for the productivity and stability of molding appearance properties of the molded articles.

As described above, in conventional art, the fact is that under molding conditions in long-term continuous molding, polyamide resins having stable productivity that are excellent in plasticization time stabilization and molding appearance stability are still unknown. Such polyamide resins are demanded on the market.

Accordingly, in view of the above circumstances, it is a main object of the present invention to provide a reinforced polyamide resin pellet that is excellent in plasticization time stability during molding and molding appearance stability under molding conditions in long-term continuous molding.

Means for Solving the Problems

The present inventors have studied diligently in order to solve the above problems, and, as a result, found that the above problems can be solved by a reinforced polyamide resin pellet which comprises (A) a polyamide resin having a predetermined melting point, and (B) a predetermined inorganic filler, and which has a predetermined length, wherein the ratio of the major axis to the minor axis of the cross-section of the pellet is specified in a predetermined numerical value range, leading to the completion of the present invention.

Specifically, the present invention is as follows.

[1]
A reinforced polyamide resin pellet comprising:
(A) a polyamide resin having a melting point of 200 to 270° C.; and
(B) at least one inorganic filler selected from the group consisting of chopped strand glass fibers, carbon fibers, wollastonite, talc, mica, kaolin, barium sulfate, calcium carbonate, apatite, sodium phosphate, fluorite, silicon nitride, potassium titanate, and molybdenum disulfide, and
wherein the pellet has a length of 1 to 5 mm and a ratio of a cross-sectional major axis to minor axis (major axis/minor axis) of 1.3 to 2.5.

[2]
The reinforced polyamide resin pellet according to the above [1], comprising 1 to 300 parts by mass of the (B) inorganic filler based on 100 parts by mass of the (A) polyamide resin.

[3]
The reinforced polyamide resin pellet according to the above [1] or [2], wherein the (A) polyamide resin comprises a semi-aromatic polyamide.

Advantageous Effect of Invention

The present invention can provide a reinforced polyamide resin pellet that is excellent in plasticization time stability during long-term continuous molding and also excellent in the appearance stability of a molded article.

MODE FOR CARRYING OUT THE INVENTION

A mode for carrying out the present invention (hereinafter referred to as "present embodiment") will be described in detail below.

The present invention is not limited to the following embodiment, and various modifications can be made without departing from the spirit thereof.
[Reinforced Polyamide Resin Pellet]

A reinforced polyamide resin pellet in the present embodiment comprises:
(A) a polyamide resin having a melting point of 200 to 270° C.; and (B) at least one inorganic filler selected from the group consisting of chopped strand glass fibers, carbon fibers, wollastonite, talc, mica, kaolin, barium sulfate, calcium carbonate, apatite, sodium phosphate, fluorite, silicon nitride, potassium titanate, and molybdenum disulfide, and wherein the pellet has a length of 1 to 5 mm and a ratio of a cross-sectional major axis to minor axis (major axis/minor axis) of 1.3 to 2.5.

The components of the reinforced polyamide resin pellet in the present embodiment will be described below.

((A) Polyamide Resin)

As the above (A) polyamide resin having a melting point of 200 to 270° C. (hereinafter sometimes described as the (A) polyamide resin, the polyamide, or the (A) component), known polyamide resins can be used.

Examples of the (A) polyamide resin may include, but are not limited to, single homopolymers such as polyamide 6, polyamide 66, polyamide 610, polyamide 612, polyamide 11, polyamide 12, polyamide 46, polyamide MXD6, a polyamide obtained by polymerizing terephthalic acid and hexamethylenediamine (hereinafter polyamide 6T), and a polyamide obtained by polymerizing hexamethylenediamine and isophthalic acid (hereinafter polyamide 6I), or blends thereof.

Further examples thereof may include single copolymers comprising the above polyamides as components, or blends of the copolymers, or blends of the copolymers and homopolymers.

As the (A) polyamide resin contained in the reinforced polyamide resin pellet in the present embodiment, those comprising semi-aromatic polyamide resins containing an aromatic ring in a monomeric structural unit are preferable in terms of moldability.

As the above semi-aromatic polyamide resins, crystalline polyamides or amorphous polyamides can be used.

Examples of the above crystalline semi-aromatic polyamides may include, but are not limited to, semi-aromatic polyamides comprising at least one selected from the group consisting of a hexamethylene terephthalamide unit obtained from terephthalic acid and hexamethylenediamine (hereinafter described as a 6T component), a hexamethylene isophthalamide unit obtained from isophthalic acid and hexamethylenediamine (hereinafter described as a 6I component), and a meta-xylylene adipamide unit obtained from adipic acid and meta-xylylenediamine (hereinafter described as a MXD6 component), copolymers of at least one selected from the group consisting of the above 6T component, 6I component, and MXD6 component, and a hexamethylene adipamide unit obtained from adipic acid and hexamethylenediamine (hereinafter described as a 66 component), and blends with homopolymers and/or copolymers of the units.

Examples of the above amorphous semi-aromatic polyamides may include, but are not limited to, a polyamide obtained from terephthalic acid and trimethylhexamethylenediamine; a polyamide obtained from bis(4-amino-methylhexyl)methane, hexamethylenediamine, terephthalic acid, isophthalic acid, and caprolactam; and an amorphous polyamide obtained from bis(4-amino-3-methylcyclohexyl)methane, bis(4-amino-methyl-5-ethylcyclohexyl)methane, hexamethylenediamine, terephthalic acid, isophthalic acid, and caprolactam.

Among these semi-aromatic polyamide resins, polyamide 66/6I is preferable in terms of plasticization time stability and appearance stability.

A raw material of the above (A) polyamide resin is not particularly limited, and examples thereof may include known amino acids (aminocarboxylic acids), lactams, salts comprising diamines and dicarboxylic acids, and oligomers thereof.

<End-Capping Agent>

As a raw material of the above (A) polyamide resin, an end-capping agent can be further added for molecular weight adjustment and hot water resistance improvement.

Examples of the end-capping agent may include, but are not limited to, monocarboxylic acids, monoamines, acid anhydrides, such as phthalic anhydride, monoisocyanates, monoacid halides, monoesters, and monoalcohols. In terms of production stability, monocarboxylic acids and monoamines are preferable.

In the present invention, one type of end-capping agent may be used, or two or more types of end-capping agents may be used in combination.

The monocarboxylic acid used as the above end-capping agent is not particularly limited as long as it is a monocarboxylic acid having reactivity with an amino group. Examples of the monocarboxylic acid may include aliphatic monocarboxylic acids, such as acetic acid, propionic acid, butyric acid, valeric acid, caproic acid, caprylic acid, lauric acid, tridecylic acid, myristic acid, palmitic acid, stearic acid, pivalic acid, and isobutyric acid; alicyclic monocarboxylic acids, such as cyclohexanecarboxylic acid; and aromatic monocarboxylic acids, such as benzoic acid, toluic acid, α-naphthalenecarboxylic acid, β-naphthalenecarboxylic acid, methylnaphthalenecarboxylic acid, and phenylacetic acid.

For these monocarboxylic acids, one type may be used alone, or two or more types may be used in combination.

The monoamine used as the above end-capping agent is not particularly limited as long as it is a monoamine having reactivity with a carboxyl group. Examples of the monoamine may include aliphatic monoamines, such as methylamine, ethylamine, propylamine, butylamine, hexylamine, octylamine, decylamine, stearylamine, dimethylamine, diethylamine, dipropylamine, and dibutylamine; alicyclic monoamines, such as cyclohexylamine and dicyclohexylamine; and aromatic monoamines, such as aniline, toluidine, diphenylamine, and naphthylamine.

For these monoamines, one type may be used alone, or two or more types may be used in combination.

<Melting Point>

The melting point of the above (A) polyamide resin is 200 to 270° C., preferably 210 to 270° C., and more preferably 210 to 265° C.

The measurement of the melting point can be performed according to JIS K7121. For example, the melting point can be measured using "DSC-7" manufactured by PerkinElmer Inc.

Specifically, 10 mg of a sample is used, the temperature is increased to 400° C. under the condition of a temperature increase rate of 20° C./min, and the peak temperature on the obtained melting curve is taken as the melting point.

When the melting point is 200° C. or higher, there is a tendency that a decrease in chemical resistance and heat resistance can be further suppressed. When the melting point is 270° C. or lower, there is a tendency that the plasticization time and appearance properties during continuous molding become stable.

<Molecular Weight>

In terms of stable moldability and mechanical property improvement, the molecular weight of the (A) polyamide resin is preferably 1.5 to 3.5, more preferably 1.8 to 3.2, when expressed as 98% sulfuric acid relative viscosity $\eta r$ (1 g/100 mL).

((B) Inorganic Filler)

The above (B) inorganic filler (hereinafter sometimes described as the inorganic filler or the (B) component) is at least one selected from the group consisting of chopped strand glass fibers, carbon fibers, wollastonite, talc, mica, kaolin, barium sulfate, calcium carbonate, apatite, sodium phosphate, fluorite, silicon nitride, potassium titanate, and molybdenum disulfide.

Among these, chopped strand glass fibers, carbon fibers, wollastonite, talc, mica, kaolin, silicone nitride, potassium titanate, and apatite are preferable, and chopped strand glass fibers are more preferable, in terms of properties, safety, and economy.

The above chopped strand glass fibers are not particularly limited, and, for example, chopped strand glass fibers of any shape, such as a modified shaped cross-section type (for example, a cocoon type and an oval type), can be used.

Among the above chopped strand glass fibers and the above carbon fibers, those having a number average fiber diameter of 3 to 30 μm are preferable, those having a weight average fiber length of 100 to 750 μm are preferable, and those having an aspect ratio of weight average fiber length to average fiber diameter (L/D) of 10 to 100 are preferable, in terms of being able to exhibit high properties.

Particularly, those having a number average fiber diameter of 3 to 30 μm, a weight average fiber length of 100 to 750 μm, and an aspect ratio of weight average fiber length to average fiber diameter (L/D) of 10 to 100 are more preferable.

For the above wollastonite, one having a number average fiber diameter of 3 to 30 μm is preferable, one having a weight average fiber length of 10 to 500 μm is preferable, and one in which the above aspect ratio (L/D) is 3 to 100 is preferable, in terms of being able to exhibit high properties.

Particularly, one which has a number average fiber diameter of 3 to 30 μm and a weight average fiber length of 10 to 500 μm and in which the above aspect ratio (L/D) is 3 to 100 is more preferable.

As the above talc, mica, kaolin, silicon nitride, and potassium titanate, those having a number average particle diameter of 0.1 to 3 μm are preferable in terms of being able to exhibit high properties.

The number average fiber diameter and weight average fiber length of the (B) inorganic filler described above can be measured by microscopy. For example, when glass fibers are contained as the (B) inorganic filler, they can be measured by a method of performing heating at a temperature equal to or higher than the decomposition temperature of the reinforced polyamide resin, taking a photograph of the remaining glass fibers using a microscope, and measuring the diameters of the glass fibers.

Examples of the methods for calculating the number average fiber diameter and the weight average fiber length from the measured values obtained by microscopy may include the following formula (1) and formula (2).

number average fiber diameter=the total of glass fiber diameters/the number of glass fibers  (1)

weight average fiber length=the sum of squares of glass fiber lengths/the total of glass fiber lengths  (2)

The above (B) inorganic filler is preferably subjected to surface treatment in terms of mechanical strength improvement.

The surface treatment agent is not particularly limited, and, for example, coupling agents and film-forming agents can be used.

The above coupling agents are not particularly limited, and examples thereof may include silane-based coupling agents and titanium-based coupling agents.

Examples of the above silane-based coupling agents may include, but are not limited to, triethoxysilane, vinyltris(β-methoxyethoxy)silane, γ-methacryloxypropyltrimethoxysilane, γ-glycidoxypropyltrimethoxysilane, β-(1,1-epoxycyclohexyl)ethyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, γ-aminopropyltrimethoxysilane, γ-aminopropyl-tris(2-methoxy-ethoxy)silane, N-methyl-γ-aminopropyltrimethoxysilane, N-vinylbenzyl-γ-aminopropyltriethoxysilane, triaminopropyltrimethoxysilane, 3-ureidopropyltrimethoxysilane, 3-hydroimidazolepropyltriethoxysilane, hexamethyldisilazane, N,O-(bistrimethylsilyl)amide, and N,N-bis(trimethylsilyl)urea.

Among these, aminosilanes and epoxysilanes, such as γ-aminopropyltrimethoxysilane, N-β-(aminoethyl)-γ-aminopropyltrimethoxysilane, γ-glycidoxypropyltrimethoxysilane, and β-(1,1-epoxycyclohexyl)ethyltrimethoxysilane, are preferable in terms of excellent economy and handling properties.

Examples of the above titanium-based coupling agents may include, but are not limited to, isopropyl triisostearoyl titanate, isopropyl tridodecylbenzenesulfonyl titanate, isopropyl tris(dioctylpyrophosphate) titanate, tetraisopropyl bis(dioctylphosphite) titanate, tetraoctyl bis(ditridecylphosphite) titanate, tetra(1,1-diallyloxymethyl-1-butyl)bis(ditridecyl)phosphite titanate, bis(dioctylpyrophosphate) oxyacetate titanate, bis(dioctylpyrophosphate)ethylene titanate, isopropyl trioctanoyl titanate, isopropyl dimethacryl isostearoyl titanate, isopropyl isostearoyl diacryl titanate, isopropyl tri(dioctylphosphate) titanate, isopropyl tricumylphenyl titanate, isopropyl tri(N-amidoethyl, aminoethyl)titanate, dicumyl phenyloxyacetate titanate, and diisostearoyl ethylene titanate.

Examples of the above film-forming agents may include, but are not limited to, polymers such as urethane-based polymers, acrylic acid-based polymers, copolymers of maleic anhydride and unsaturated monomers, such as ethylene, styrene, α-methylstyrene, butadiene, isoprene, chloroprene, 2,3 dichlorobutadiene, 1,3-pentadiene, and cyclooctadiene, epoxy-based polymers, polyester-based polymers, vinyl acetate-based polymers, and polyether-based polymers.

Among these, urethane-based polymers, acrylic acid-based polymers, butadiene maleic anhydride copolymers, ethylene maleic anhydride copolymers, styrene maleic anhydride copolymers, and mixtures thereof are preferable in terms of excellent economy and performance.

The method for performing the surface treatment of the inorganic filler (B) using the above-described coupling agents and film-forming agents is not particularly limited, and known methods can be used. Examples of the method may include sizing treatment in which an organic solvent solution or suspension of a coupling agent and a film-forming agent is applied to the surface as the so-called sizing agent; a method of performing dry mixing in which application is performed using a Henschel mixer, a super mixer, a ready mixer, a V-type blender, or the like; a spray method in which application is performed by a spray; an integral blend method; and a dry concentrate method. Further examples may include methods combining these methods (for example, a method of applying a coupling agent and part of a film-forming agent by sizing treatment, and then spraying the remaining film-forming agent). Among these, sizing treatment, dry mixing, the spray method, and methods combining these are preferable in terms of excellent economy.

The amount of the above (B) inorganic filler blended based on 100 parts by mass of the above (A) polyamide resin is not particularly limited, and is preferably 1 to 300 parts by mass, more preferably 1 to 200 parts by mass, still more preferably 1 to 180 parts by mass, and still more preferably 5 to 150 parts by mass.

By setting the amount of the inorganic filler (B) blended within the above range, excellent mechanical properties, and good extrudability and moldability are provided. For these (B) inorganic fillers, one type may be used alone, or two or more types may be used in combination.

(Other Materials)

<Degradation Inhibitor>

A degradation inhibitor described later may be added to the reinforced polyamide resin pellet in the present embodiment, as required, in a range that does not impair the object of the present invention, for the purpose of preventing heat degradation and discoloration under heat and improving heat aging resistance and weather resistance.

Examples of the degradation inhibitor may include, but are not limited to, copper compounds, such as copper acetate and copper iodide; phenol-based stabilizers, such as hindered phenol compounds; phosphite-based stabilizers; hindered amine-based stabilizers; triazine-based stabilizers; and sulfur-based stabilizers.

For these degradation inhibitors, one type may be used alone, or two or more types may be used in combination.

<Moldability-Improving Agent>

A moldability-improving agent may be blended in the reinforced polyamide resin pellet in the present embodiment, as required, in a range that does not impair the object of the present invention.

Examples of the moldability-improving agent may include, but are not limited to, higher fatty acids, higher fatty acid metal salts, higher fatty acid esters, and higher fatty acid amides.

Examples of the above higher fatty acids may include, but are not limited to, saturated or unsaturated, linear or branched aliphatic monocarboxylic acids having 8 to 40 carbon atoms, such as stearic acid, palmitic acid, behenic acid, erucic acid, oleic acid, lauric acid, and montanic acid.

Among these, stearic acid and montanic acid are preferable in terms of releasability.

The above higher fatty acid metal salts are metal salts of the above higher fatty acids.

As the metal elements of the metal salts, group 1, 2, and 3 elements of the periodic table of elements, zinc, aluminum, and the like are preferable, and group 1 and 2 elements, such as calcium, sodium, potassium, and magnesium, aluminum, and the like are more preferable, in terms of the stability of the higher fatty acid metal salts.

Examples of the higher fatty acid metal salts may include, but are not limited to, calcium stearate, aluminum stearate, zinc stearate, magnesium stearate, calcium montanate, sodium montanate, and calcium palmitate.

Among these, metal salts of montanic acid and metal salts of stearic acid are preferable in terms of releasability.

The above higher fatty acid esters are esterified products of the above higher fatty acids and alcohols.

As the above higher fatty acid esters, esters of aliphatic carboxylic acids having 8 to 40 carbon atoms and aliphatic alcohols having 8 to 40 carbon atoms are preferable in terms of releasability.

Examples of the aliphatic alcohols may include, but are not limited to, stearyl alcohol, behenyl alcohol, and lauryl alcohol.

Examples of the higher fatty acid esters may include, but are not limited to, stearyl stearate and behenyl behenate.

The above higher fatty acid amides are amide compounds of the above higher fatty acids.

Examples of the above higher fatty acid amides may include, but are not limited to, stearic acid amide, oleic acid amide, erucic acid amide, ethylenebisstearylamide, ethylenebisoleylamide, N-stearylstearylamide, and N-stearylerucic acid amide.

The higher fatty acid amides are preferably stearic acid amide, erucic acid amide, ethylenebisstearylamide, and N-stearylerucic acid amide, and more preferably ethylenebisstearylamide and N-stearylerucic acid amide, in terms of releasability.

For each of these higher fatty acids, higher fatty acid metal salts, higher fatty acid esters, and higher fatty acid amides, one type may be used alone, or two or more types may be used in combination.

<Colorant>

A colorant may be added to the reinforced polyamide resin pellet in the present embodiment, as required, in a range that does not impair the object of the present invention.

Examples of the colorant may include, but are not limited to, dyes, such as nigrosine, pigments, such as titanium oxide and carbon black; particles of metals, such as aluminum, colored aluminum, nickel, tin, copper, gold, silver, platinum, iron oxide, stainless, and titanium; a pearl pigment made of mica; and metallic pigments, such as colored graphite, colored glass fibers, and colored glass flakes.

<Other Resins>

Other resins may be blended in the reinforced polyamide resin pellet in the present embodiment, as required, in a range that does not impair the object of the present invention.

Such other resins are not particularly limited, and examples thereof may include thermoplastic resins and rubber components described later.

Examples of the above thermoplastic resins may include, but are not limited to, polystyrene-based resins, such as atactic polystyrene, isotactic polystyrene, syndiotactic polystyrene, AS resins, and ABS resins; polyester-based resins, such as polyethylene terephthalate and polybutylene terephthalate; polyether-based resins, such as polycarbonates, polyphenylene ether, polysulfones, and polyethersulfones; condensation type resins, such as polyphenylene sulfide and polyoxymethylene; acrylic resins, such as polyacrylic acid, polyacrylates, and polymethyl methacrylate; polyolefin-based resins, such as polyethylene, polypropylene, polybutene, and ethylene-propylene copolymers; halogen-containing vinyl compound-based resins, such as polyvinyl chloride and polyvinylidene chloride; phenolic resins; and epoxy resins.

For these thermoplastic resins, one type may be used alone, or two or more types may be used in combination.

Examples of the above rubber components may include, but are not limited to, natural rubbers, polybutadiene, polyisoprene, polyisobutylene, neoprene, polysulfide rubbers, Thiokol rubbers, acrylic rubbers, urethane rubbers, silicone rubbers, epichlorohydrin rubbers, styrene-butadiene block copolymers (SBR), hydrogenated styrene-butadiene block copolymers (SEB), styrene-butadiene-styrene block copolymers (SBS), hydrogenated styrene-butadiene-styrene block copolymers (SEBS), styrene-isoprene block copolymers (SIR), hydrogenated styrene-isoprene block copolymers (SEP), styrene-isoprene-styrene block copolymers (SIS), hydrogenated styrene-isoprene-styrene block copolymers (SEPS), styrene-butadiene random copolymers, hydrogenated styrene-butadiene random copolymers, styrene-ethylene-propylene random copolymers, styrene-ethylene-butylene random copolymers, ethylene-propylene copolymers (EPR), ethylene-(1-butene) copolymers, ethylene-(1-hexene) copolymers, ethylene-(1-octene) copolymers, ethylene-propylene-diene copolymers (EPDM), and core shell type rubber materials, such as butadiene-acrylonitrile-styrene-core shell rubbers (ABS), methyl methacrylate-butadiene-styrene-core shell rubbers (MBS), methyl methacrylate-butyl acrylate-styrene-core shell rubbers (MAS), octyl acrylate-butadiene-styrene-core shell rubbers (MABS), alkyl acrylate-butadiene-acrylonitrile-styrene core shell rubbers (AABS), butadiene-styrene-core shell rubbers (SBR), and siloxane-containing core shell rubbers including methyl methacrylate-butyl acrylate siloxane.

For these rubber components, one type may be used alone, or two or more types may be used in combination.

[Reinforced Polyamide Resin Pellet]

The reinforced polyamide resin pellet in the present embodiment has a length of 1 to 5 mm and a ratio of a cross-sectional major axis to minor axis (major axis/minor axis) of 1.3 to 2.5.

The cross-section of the pellet is a cross-section when the pellet is cut in a plane generally perpendicular to the length direction of the above pellet.

The length of the pellet is preferably 1 to 4 mm, more preferably 1.5 to 4 mm. By setting the pellet length to 1 mm or more, a reinforced polyamide resin pellet excellent in the ability to be taken into the screw of an extruder can be provided. On the other hand, by setting the pellet length to 5 mm or less, a reinforced polyamide resin pellet excellent in plasticization time stability and appearance stability during continuous molding can be provided.

Next, the ratio of the major axis to the minor axis (major axis/minor axis) of the pellet cross-section is preferably 1.3 to 2.4, more preferably 1.3 to 2.3. By setting the ratio of the length of the major axis to the minor axis (major axis/minor axis) of the pellet cross-section in the range of 1.3 to 2.5, a reinforced polyamide resin pellet excellent in plasticization time stability and appearance stability during continuous molding can be provided.

The pellet average length can be measured, for example, by a method of taking out 100 reinforced polyamide resin pellets, and measuring the length of each pellet. Examples of the method for calculating the pellet average length may include the following formula (3).

$$\text{pellet average length} = \text{the total of pellet lengths}/\text{the number of pellets} \quad (3)$$

The ratio of the major axis to the minor axis (major axis/minor axis) of the pellet cross-section can be measured, for example, by a method of taking out 100 reinforced polyamide resin pellets, and measuring the lengths of the maximum diameter and minimum diameter of the cross-section of each pellet. Examples of the method for calculating the ratio of the major axis to the minor axis of the pellet cross-section may include the following formula (4).

$$\text{the ratio of the major axis to the minor axis of the pellet cross-section} = (\text{the total of the maximum diameters of pellets}/\text{the total of pellet minimum diameters})/\text{the number of pellets} \quad (4)$$

The method for producing the reinforced polyamide resin pellets in the present embodiment is not particularly limited as long as it is a method of mixing the above (A) polyamide resin, the (B) inorganic filler, and the above-described degradation inhibitor, moldability-improving agent, colorant, and other resins as required.

Examples of the method may include a method of mixing the (A) polyamide resin, the (B) inorganic filler, and other materials as required, using a Henschel mixer or the like, supplying the mixture to a melting and kneading machine, and kneading the mixture, and a method of blending the (B) inorganic filler, and other materials as required, from side feeders into the (A) polyamide resin put in a molten state by a single-screw or twin-screw extruder equipped with a pressure reducing apparatus.

In the step of supplying components constituting the reinforced polyamide resin pellets to a melting and kneading machine, and mixing the components, all constituents may be supplied to the same supply port at a time, or the constituents may be supplied from different supply ports, respectively.

The melting and kneading temperature is preferably 50° C. or more higher than the melting point of the (A) polyamide resin. The melting and kneading time is preferably about 0.25 to 5 minutes.

The apparatus for performing melting and kneading is not particularly limited, and known apparatuses, for example, melting and kneading machines, such as single-screw or twin-screw extruders, Banbury mixers, and mixing rolls, can be used.

After melting and kneading was performed in the above melting and kneading machine, strands are extruded from the die nozzle.

The strands are in a high temperature state of 230 to 350° C., and cannot be cut as they are because they would be crushed by the cutter roller of a pelletizer. Therefore, the strands are cooled to a temperature equal to or lower than the melting point of the (A) polyamide resin. Generally, water is used for this cooling, and the strands extruded from the die nozzle are cooled in water.

When the strands are cooled in water, generally, the strands are passed through water using a water tank. The water immersion length of the strands in water is preferably 90 cm or less in terms of the suppression of water absorption. The water immersion length is more preferably 80 cm or less, still more preferably 60 cm or less.

Next, the cooled strands are cut by a pelletizer to provide pellets. The reinforced polyamide resin pellets in the present embodiment can be obtained by adjusting the take-up roll suppress pressure of the pelletizer and the rotation speed of the cutter, and setting the water immersion length of the strands in water described above to 90 cm or less.

Specifically, for example, the pellet length can be changed by changing the rotation speed of the cutter. The pellet length can be shortened by increasing the number of revolutions of the cutter, and the pellet length can be adjusted to be long by decreasing the number of revolutions of the cutter.

In addition, for the ratio of the major axis to the minor axis of the pellet cross-section, reinforced polyamide resin pellets in which the ratio of the major axis to the minor axis of the cross-section of the pellet is 1.3 to 2.5 can be obtained by setting the water immersion length of the strands to 90 cm or less, and setting the take-up roll suppress pressure of the pelletizer to be strong. The method is not particularly limited.

[Molded Article]

By using the reinforced polyamide resin pellets in the present embodiment, and molding these, the desired molded article is obtained.

The molding method is not particularly limited, and known molding methods can be used.

Examples of the molding method may include molding methods such as extrusion, injection molding, vacuum forming, blow molding, injection compression molding, decorative molding, multi-material molding, gas-assisted injection molding, foam injection molding, low pressure molding, ultrathin-wall injection molding (ultrahigh speed injection molding), and in-mold composite molding (insert molding and outsert molding).

[Applications]

The reinforced polyamide resin pellet in the present embodiment is excellent in plasticization time stability and appearance stability during continuous molding, and therefore can be used in various applications.

For example, the reinforced polyamide resin pellet in the present embodiment can be preferably used in the automobile field, the electrical and electronic field, the mechanical and industrial field, the office equipment field, and the aerospace field.

EXAMPLES

The present invention will be described below in detail by giving specific Examples and Comparative Examples, but the present invention is not limited to the following Examples.

[Methods for Measuring Structures and Properties of Materials]

<Measurement of Molecular Weight (Relative Viscosity ηr at 25° C.)>

The molecular weight of a polyamide resin was carried out according to JIS-K6810, and measured as relative viscosity ηr at 25° C.

Specifically, using 98% sulfuric acid, a solution at a concentration of 1% (the proportion of {1 g of the polyamide resin/100 mL of 98% sulfuric acid}) was prepared, and the measurement was performed at 25° C.

<Melting Point of Polyamide Resin (° C.)>

The melting point was measured according to JIS K7121 using "DSC-7" manufactured by PerkinElmer Inc.

For the measurement conditions, the temperature of about 10 mg of a sample was increased at a temperature increase rate of 20° C./min under a nitrogen atmosphere, and the temperature of an endothermic peak (melting peak) that appeared at the time was taken as Tm1 (° C.). The temperature was kept in a molten state at Tm1+40° C. for 2 minutes, then decreased to 30° C. at a temperature decrease rate of 20° C./min, maintained for 2 minutes, and then increased at a temperature increase rate of 20° C./min, and the peak temperature of an endothermic peak (melting peak) that appeared at the time was taken as the melting point (Tm2 (° C.)).

<Evaluation of Plasticization Time Stability>

For the measurement apparatus, "FN3000" manufactured by Nissei Plastic Industrial Co., Ltd. was used.

The cylinder temperature was set to the melting point of the polyamide resin used+30° C., the mold temperature was set to 80° C., and up to 1000 shots were molded under the injection molding conditions of 10 seconds of injection and 20 seconds of cooling to obtain ISO test pieces.

The plasticization time stability (standard deviation) was obtained by the following formula.

$$\text{Plasticization time stability (standard deviation)} = \sqrt{\frac{1}{n}\sum_{i=1}^{n}(Ai - X1)^2} \quad [\text{Expression 1}]$$

$$X1 = \frac{1}{n}\sum_{i=1}^{n} Ai$$

Ai=the plasticization time of each of 1000 shots
X1=the arithmetic mean of 1000 shots
n=the number of shots (1000 shots)

It was determined that the smaller the above standard deviation (σ) was, the better the plasticization time stability was.

<Evaluation of Appearance Stability>

The gloss values of the ISO test pieces used in the above moldability stability test were measured, and the appearance stability was obtained by the following formula.

The appearance stability was obtained by measuring the gloss values using a handy glossmeter "IG320" manufactured by HORIBA, LTD., and using the following method.

$$\text{Appearance stability (standard deviation)} = \sqrt{\frac{1}{n}\sum_{i=1}^{n}(Bi - X2)^2} \quad [\text{Expression 2}]$$

$$X2 = \frac{1}{n}\sum_{i=1}^{n} Bi$$

Bi=the gloss value of each of 1000 shots
X2=the arithmetic mean of 1000 shots
n=the number of shots (1000 shots)

It was determined that the smaller the above standard deviation (σ) was, the better the appearance stability was.

<State of Occurrence of Molding Machine Hopper Bridging>

For the measurement apparatus, "FN3000" manufactured by Nissei Plastic Industrial Co., Ltd. was used.

The cylinder temperature was set to the melting point of a polyamide resin+30° C., the mold temperature was set to 80° C., and up to 1000 shots were molded under the injection molding conditions of 10 seconds of injection and 20 seconds of cooling. The state of occurrence of bridging in the hopper was evaluated.

Evaluation indicators are shown below.

◯: no bridging occurs, Δ: bridging occurs, X: bridging occurs, and fuzz occurs.

<Processability (Amount of Chips Formed)>

1 kg of reinforced polyamide resin pellets obtained in each of Examples and Comparative Examples described later were sieved for 1 minute using a 40 mesh sieve (opening: 0.425 mm), and the amount of fallen chips was measured. The amount of chips formed was obtained by the following method.

the amount of chips formed (% by mass)=the amount of chips (kg)/1 kg of the reinforced polyamide resin×100

It was determined that the smaller the amount of chips was, the better the processability was.

[(A) Polyamide Resins]

(Materials)

The polyamide resins of the following <Production Example 1> to <Production Example 4> to be contained in the reinforced polyamide resin pellets in the Examples and Comparative Examples described later were produced using the following compounds.

(1) Adipic acid, manufactured by Wako Pure Chemical Industries, Ltd., trade name: Adipic Acid
(2) Isophthalic acid, manufactured by Wako Pure Chemical Industries, LTD., trade name: Isophthalic Acid (3) Terephthalic acid, manufactured by Wako Pure Chemical Industries, Ltd., trade name: Terephthalic Acid
(4) Hexamethylenediamine, manufactured by Wako Pure Chemical Industries, Ltd., trade name: Hexamethylenediamine
(5) ε-caprolactam, manufactured by Wako Pure Chemical Industries, Ltd., trade name: ε-caprolactam The polyamide resins were produced, and measurement and evaluation were performed by the above-described methods.

Production Example 1

Production of Polyamide Resin (A1)

1500 g of an equimolar salt of adipic acid and hexamethylenediamine, adipic acid 0.5 mole % in excess of all equimolar salt components were dissolved in 1500 g of distilled water to make an equimolar 50% by mass homogeneous aqueous solution of the raw material monomers.

An autoclave having an internal volume of 5.4 L was charged with this aqueous solution, and nitrogen replacement was performed.

While the aqueous solution was stirred at a temperature of 110 to 150° C., the aqueous solution was concentrated to a solution concentration of 70% by mass by gradually removing water vapor.

Then, the internal temperature was increased to 220° C.

At this time, the pressure of the autoclave was increased to 1.8 MPa.

The aqueous solution was reacted as it was for 1 hour while water vapor was gradually removed and the pressure was kept at 1.8 MPa, until the internal temperature reached 260° C.

Next, the pressure was decreased to 1 MPa over 1 hour, and then, the inside of the autoclave was maintained under a reduced pressure of 650 torr by a vacuum apparatus for 10 minutes.

At this time, the final internal temperature of the polymerization was 290° C.

Then, pressure was applied with nitrogen, and the polymer was formed in the form of strands from the lower spinneret (nozzle), water-cooled, cut, discharged in the form of pellets, and dried at 100° C. under a nitrogen atmosphere for 12 hours to obtain a polyamide resin (A1). The relative viscosity ηr of the obtained polyamide resin (A1) at 25° C. was 2.8.

Production Example 2

Production of Polyamide Resin (A2)

1044 g of an equimolar salt of adipic acid and hexamethylenediamine, 456 g of an equimolar salt of isophthalic acid and hexamethylenediamine, and adipic acid 0.5 mole % in excess of all equimolar salt components were dissolved in 1500 g of distilled water to make an equimolar 50% by mass homogeneous aqueous solution of the raw material monomers.

An autoclave having an internal volume of 5.4 L was charged with this aqueous solution, and nitrogen replacement was performed.

While the aqueous solution was stirred at a temperature of 110 to 150° C., the aqueous solution was concentrated to a solution concentration of 70% by mass by gradually removing water vapor.

Then, the internal temperature was increased to 220° C.

At this time, the pressure of the autoclave was increased to 1.8 MPa.

The aqueous solution was reacted as it was for 1 hour while water vapor was gradually removed and the pressure was kept at 1.8 MPa, until the internal temperature reached 260° C.

Next, the pressure was decreased to 1 MPa over 1 hour, and then, the inside of the autoclave was maintained under a reduced pressure of 650 torr by a vacuum apparatus for 10 minutes.

At this time, the final internal temperature of the polymerization was 290° C.

Then, pressure was applied with nitrogen, and the polymer was formed in the form of strands from the lower spinneret (nozzle), water-cooled, cut, discharged in the form of pellets, and dried at 100° C. under a nitrogen atmosphere for 12 hours to obtain a polyamide resin (A2). The relative viscosity ηr of the obtained polyamide resin (A2) at 25° C. was 2.5.

Production Example 3

Production of Polyamide Resin (A3)

1109 g of an equimolar salt of adipic acid and hexamethylenediamine, 368 g of an equimolar salt of isophthalic acid and hexamethylenediamine, 5 g of ε caprolactam, and adipic acid 0.5 mole % in excess of all equimolar salt components were dissolved in 1500 g of distilled water to make an equimolar 50% by mass homogeneous aqueous solution of the raw material monomers.

An autoclave having an internal volume of 5.4 L was charged with this aqueous solution, and nitrogen replacement was performed.

While the aqueous solution was stirred at a temperature of 110 to 150° C., the aqueous solution was concentrated to a solution concentration of 70% by mass by gradually removing water vapor.

Then, the internal temperature was increased to 220° C.

At this time, the pressure of the autoclave was increased to 1.8 MPa.

The aqueous solution was reacted as it was for 1 hour while water vapor was gradually removed and the pressure was kept at 1.8 MPa, until the internal temperature reached 260° C.

Next, the pressure was decreased to 1 MPa over 1 hour, and then, the inside of the autoclave was maintained under a reduced pressure of 650 torr by a vacuum apparatus for 10 minutes.

At this time, the final internal temperature of the polymerization was 290° C.

Then, pressure was applied with nitrogen, and the polymer was formed in the form of strands from the lower spinneret (nozzle), water-cooled, cut, discharged in the form of pellets, and dried at 100° C. under a nitrogen atmosphere for 12 hours to obtain a polyamide resin (A3). The relative viscosity ηr of the obtained polyamide resin (A3) at 25° C. was 2.4.

Production Example 4

Production of Polyamide Resin (A4)

675 g of an equimolar salt of adipic acid and hexamethylenediamine, 825 g of an equimolar salt of terephthalic acid and hexamethylenediamine, and adipic acid 0.5 mole % in excess of all equimolar salt components were dissolved in 1500 g of distilled water to make an equimolar 50% by mass homogeneous aqueous solution of the raw material monomers.

An autoclave having an internal volume of 5.4 L was charged with this aqueous solution, and nitrogen replacement was performed.

While the aqueous solution was stirred at a temperature of 110 to 150° C., the aqueous solution was concentrated to a solution concentration of 70% by mass by gradually removing water vapor.

Then, the internal temperature was increased to 220° C.

At this time, the pressure of the autoclave was increased to 1.8 MPa.

The aqueous solution was reacted as it was for 1 hour while water vapor was gradually removed and the pressure was kept at 1.8 MPa, until the internal temperature reached 300° C.

Next, the pressure was decreased to 1 MPa over 1 hour, and then, the inside of the autoclave was maintained under a reduced pressure of 650 torr by a vacuum apparatus for 10 minutes.

At this time, the final internal temperature of the polymerization was 330° C.

Then, pressure was applied with nitrogen, and the polymer was formed in the form of strands from the lower spinneret (nozzle), water-cooled, cut, discharged in the form of pellets, and dried at 100° C. under a nitrogen atmosphere for 12 hours to obtain a polyamide resin (A4). The relative viscosity ηr of the obtained polyamide resin (A4) at 25° C. was 2.5.

[(B) Inorganic Fillers]

As inorganic fillers to be contained in the reinforced polyamide resin pellets in the Examples and Comparative Examples described later, the following materials were used.

(B1) Glass fibers, manufactured by Nippon Electric Glass Co., Ltd., trade name ECS03T275H
average fiber diameter (average particle diameter) 10 μm (perfect circle shape), cut length 3 mm (B2) Wollastonite, manufactured by NYCO, trade name NYAD400
average fiber diameter (average particle diameter) 7.0 μm, average fiber length 35 μm (B3) Wollastonite, manufactured by NYCO, trade name NYAD5000
average fiber diameter (average particle diameter) 2.2 μm, average fiber length 7.2 μm (B4) Talc, manufactured by FUJI TALC INDUSTRIAL CO., LTD., trade name PKP-80
average particle diameter 14 μm (B5) Mica, manufactured by YAMAGUCHI MICA CO., LTD., trade name A-21
average particle diameter 22 μm (B6) Kaolin, manufactured by HAYASHI KASEI CO., LTD., trade name TRANSLINK445, average particle diameter 1.5 μm (B7) Glass fiber rovings, manufactured by Chongqing Polycomp International Corporation, trade name: ER4301H, average fiber diameter (average particle diameter) 17 μm, roving TEX number: 1200 TEX, specific gravity 2.54

[Reinforced Polyamide Resin Pellets]

Examples 1 and 2

100 Parts by mass of the polyamide resin (A1) of Production Example 1 described above was supplied to a ZSK 40 mm twin-screw extruder manufactured by Coperion K.K. (set temperature: a temperature about 30° C. higher than the melting point of the polyamide resin (A1) obtained according to the above melting point measurement method, the number of revolutions of the screw 300 rpm) from the top feed port.

Further, the inorganic filler (B1) was supplied according to the parts by mass shown in the following Table 1 from the side feed port.

The melted and kneaded material extruded from the die outlet was cooled in the form of strands and pelletized to obtain reinforced polyamide resin pellets.

The ratio of the major axis to the minor axis of the cross-section of the pellet was adjusted by setting the water immersion length to 60 cm or less in cooling the melted and kneaded material extruded from the die outlet, in the form of strands, and by changing the take-up roll suppress pressure of the pelletizer when taking up the strands.

The pellet length was adjusted by changing the roll take-off speed of the pelletizer and the rotation speed of the cutter.

The evaluation of plasticization time stability, appearance stability, and the state of occurrence of hopper bridging described above was performed by the above-described methods. In addition, the amount of chips formed was measured.

The evaluation results are shown in the following Table 1.

Examples 3 to 13

Instead of the polyamide resin (A1) of Production Example 1, the polyamide resin (A2) of Production Example 2 described above was used. Further, the type and parts by mass of the (B) inorganic filler supplied to 100 parts by mass of the polyamide resin were changed to those shown in the following Table 1.

The evaluation of plasticization time stability, appearance stability, and the state of occurrence of hopper bridging described above was performed by the above-described methods. In addition, the amount of chips formed was measured.

The evaluation results are shown in the following Table 1.

Example 14

100 Parts by mass of the polyamide resin (A2) of Production Example 2 was supplied to a ZSK 40 mm twin-screw extruder manufactured by Coperion K.K. (set temperature: a temperature about 30° C. higher than the melting point of the polyamide resin (A2) obtained according to the above melting point measurement method, the number of revolutions of the screw 300 rpm) from the top feed port.

Further, side feed ports were provided at two places, and the inorganic filler (B1) was supplied according to the parts by mass shown in the following Table 1 from the side feed port 1 on the upstream side of the extruder (a state in which the resin supplied from the top feed port was sufficiently melted).

The above inorganic filler (B2) was supplied according to the parts by mass shown in the following Table 1 from the side feed port 2 on the downstream side of the extruder (a state in which the resin supplied from the top feed port was sufficiently melted).

The ratio of the major axis to the minor axis of the cross-section of the pellet was adjusted by setting the water immersion length to 60 cm or less in cooling the melted and kneaded material extruded from the die outlet, in the form of strands, and by changing the take-up roll suppress pressure of the pelletizer when taking up the strands.

The pellet length was adjusted by doing the roll take-off speed of the pelletizer and the rotation speed of the cutter.

The evaluation of plasticization time stability, appearance stability, and the state of occurrence of hopper bridging described above was performed by the above-described methods. In addition, the amount of chips formed was measured.

The evaluation results are shown in the following Table 1.

Example 15

Instead of the polyamide resin (A1) of Production Example 1, the polyamide resin (A3) of Production Example 3 described above was used. Operation was carried out as in Example 1 except that further, the type and amount of the (B) inorganic filler supplied to 100 parts by mass of the polyamide resin were changed to the type and parts by mass shown in the following Table 1.

The evaluation of plasticization time stability, appearance stability, and the state of occurrence of hopper bridging described above was performed by the above-described methods. In addition, the amount of chips formed was measured.

The evaluation results are shown in the following Table 1.

Comparative Examples 1 to 4

100 Parts by mass of the polyamide resin (A1) of Production Example 1 described above was supplied to a ZSK 40 mm twin-screw extruder manufactured by Coperion K.K. (set temperature: a temperature about 30° C. higher than the melting point of the polyamide resin (A1) obtained according to the above melting point measurement method, the number of revolutions of the screw 300 rpm) from the top feed port.

Further, the inorganic filler (B1) was supplied according to the parts by mass shown in the following Table 1 from the side feed port.

The melted and kneaded material extruded from the die outlet was cooled in the form of strands and pelletized to obtain reinforced polyamide resin pellets.

The ratio of the major axis to the minor axis of the cross-section of the pellet was adjusted by setting the water immersion length to 100 cm or more in cooling the melted and kneaded material extruded from the die outlet, in the form of strands, and by changing the take-up roll suppress pressure of the pelletizer when taking up the strands.

The pellet length was adjusted by doing the roll take-off speed of the pelletizer and the rotation speed of the cutter.

The evaluation of plasticization time stability, appearance stability, and the state of occurrence of hopper bridging described above was performed by the above-described methods. In addition, the amount of chips formed was measured.

The evaluation results are shown in the following Table 1.

Comparative Examples 5 and 6

A twin-screw extruder (product name "ZSK25," manufactured by Coperion K.K.) was used, and the polyamide resin (A1) was supplied from the top feed port.

The cylinder set temperature was set to 310° C., which was the melting point of the polyamide resin (A1) Tm+50° C., and the number of revolutions of the screw was set to 300 rpm, and the polyamide resin (A1) was melted and kneaded in the extruder.

Then, the melted and kneaded polyamide resin was supplied to an impregnation die (volume: 375 cc) equipped with a resin impregnation roller in a long fiber-reinforced resin production apparatus (product name "KOSLFP-212," manufactured by Kobe Steel, Ltd.).

On the other hand, a bundle of three glass fiber rovings (B7) (1200×3=3600 TEX) was introduced from a roving stand into the impregnation die crosshead filled with the melted and kneaded material of the polyamide resin.

The glass fiber roving bundle impregnated with the melted and kneaded material of the polyamide resin in the impregnation die was continuously pulled out of the nozzle (nozzle diameter: 2.4 mm) of the impregnation die to obtain one strand.

Then, the strand was cooled and solidified in a water-cooled bath, and then cut by a pelletizer to obtain resin pellets having a composition shown in Table 1.

The strand take-off speed was set to the fastest condition in order to reduce heat residence time in a range in which the impregnation state of the melted and kneaded material of the polyamide resin was sufficient. The speed was 30 m/min.

The ratio of the major axis to the minor axis of the cross-section of the resin pellet was adjusted by the shape of the nozzle of the impregnation die, by setting the water immersion length to 100 cm or more in cooling one strand continuously pulled out of the nozzle outlet of the impregnation die, and by changing the take-up roll suppress pressure of the pelletizer when taking up the strand. The resin pellet length was adjusted by doing the roll take-off speed of the pelletizer and the rotation speed of the cutter.

The evaluation of plasticization time stability, appearance stability, and the state of occurrence of hopper bridging described above was performed by the above-described methods. In addition, the amount of chips formed was measured.

The evaluation results are shown in the following Table 1.

Comparative Examples 7 to 10

Operation was carried out as in Comparative Example 1 except that instead of the polyamide resin (A1) of Production Example 1, the polyamide resin (A2) of Production Example 2 described above was used.

The evaluation of plasticization time stability, appearance stability, and the state of occurrence of hopper bridging described above was performed by the above-described methods. In addition, the amount of chips formed was measured.

The evaluation results are shown in the following Table 1.

Comparative Examples 11 and 12

Operation was carried out as in Comparative Example 5 except that instead of the polyamide resin (A1) of Production Example 1, the polyamide resin (A2) of Production Example 2 described above was used.

The evaluation of plasticization time stability, appearance stability, and the state of occurrence of hopper bridging described above was performed by the above-described methods. In addition, the amount of chips formed was measured.

The evaluation results are shown in the following Table 1.

Comparative Example 13

100 Parts by mass of the polyamide resin (A4) of Production Example 4 described above was supplied to a ZSK 40 mm twin-screw extruder manufactured by Coperion K.K. (set temperature: a temperature about 30° C. higher than the melting point of the polyamide copolymer obtained according to the above melting point measurement method, the number of revolutions of the screw 300 rpm) from the top feed port.

Further, the inorganic filler (B1) was supplied from the side feed port.

The melted and kneaded material extruded from the die outlet was cooled in the form of strands and pelletized to obtain reinforced polyamide resin pellets.

The ratio of the major axis to the minor axis of the cross-section of the pellet was adjusted by setting the water immersion length to 60 cm or less in cooling the melted and kneaded material extruded from the die outlet, in the form of strands, and by changing the take-up roll suppress pressure of the pelletizer when taking up the strands.

The pellet length was adjusted by doing the roll take-off speed of the pelletizer and the rotation speed of the cutter.

The evaluation of plasticization time stability, appearance stability, and the state of occurrence of hopper bridging described above was performed by the above-described methods. In addition, the amount of chips formed was measured.

The evaluation results are shown in the following Table 1.

As shown in the above Table 1, it was confirmed that all of the reinforced polyamide resin pellets of Examples 1 to 15 had extremely excellent plasticization time stability and appearance stability during long-term continuous molding. Further, it was confirmed that the amount of chips formed was small.

On the other hand, it was confirmed that in the reinforced polyamide resin pellets of Comparative Examples 1 to 13 that did not satisfy the requirements of the present invention in at least some of the major axis/minor axis ratio (major axis/minor axis) of the pellet cross-section, the pellet length, the (B) inorganic filler, and the melting point of the (A) polyamide resin, the plasticization time stability and appearance stability during long-term continuous molding decreased greatly.

This application is based on Japanese Patent Application No. 2011-118723 filed with the Japan Patent Office on May 27, 2011, the content of which is incorporated herein by reference.

TABLE 1

| | Polyamide resin pellet composition | | | | | Pellet shape | | Processability | Moldability | | State of occurrence of molding machine |
|---|---|---|---|---|---|---|---|---|---|---|---|
| | (A) Polyamide | | | (B) Inorganic filler | | | Major axis/minor axis ratio of | Amount of | Plasticization time stability | Appearance stability | |
| | Type | Parts by mass | Melting point (° C.) | Type | Parts by mass | Pellet length (mm) | pellet cross-section | chips formed (% by mass) | (standard deviation) | (standard deviation) | hopper bridging |
| Example 1 | A1 | 100 | 260 | B1 | 50 | 3.0 | 1.35 | 0.0086 | 0.24 | 1.89 | ○ |
| Example 2 | A1 | 100 | 260 | B1 | 50 | 3.1 | 1.65 | 0.0084 | 0.25 | 1.92 | ○ |
| Example 3 | A2 | 100 | 237 | B1 | 50 | 3.1 | 1.37 | 0.0082 | 0.20 | 1.33 | ○ |
| Example 4 | A2 | 100 | 237 | B1 | 50 | 3.2 | 1.98 | 0.0075 | 0.15 | 1.22 | ○ |
| Example 5 | A2 | 100 | 237 | B1 | 100 | 3.0 | 1.76 | 0.0080 | 0.18 | 1.32 | ○ |
| Example 6 | A2 | 100 | 237 | B1 | 50 | 3.0 | 2.44 | 0.0070 | 0.21 | 1.41 | ○ |
| Example 7 | A2 | 100 | 237 | B1 | 50 | 1.5 | 1.92 | 0.0076 | 0.20 | 1.35 | ○ |
| Example 8 | A2 | 100 | 237 | B1 | 50 | 4.5 | 1.88 | 0.0077 | 0.22 | 1.48 | ○ |
| Example 9 | A2 | 100 | 237 | B2 | 50 | 3.2 | 2.01 | 0.0085 | 0.16 | 1.23 | ○ |
| Example 10 | A2 | 100 | 237 | B3 | 50 | 3.3 | 2.04 | 0.0083 | 0.17 | 1.21 | ○ |
| Example 11 | A2 | 100 | 237 | B4 | 50 | 3.1 | 1.95 | 0.0080 | 0.16 | 1.22 | ○ |
| Example 12 | A2 | 100 | 237 | B5 | 50 | 3.0 | 2.10 | 0.0081 | 0.17 | 1.24 | ○ |
| Example 13 | A2 | 100 | 237 | B6 | 50 | 3.0 | 1.97 | 0.0085 | 0.18 | 1.23 | ○ |
| Example 14 | A2 | 100 | 237 | B1 B2 | 80 40 | 3.0 | 1.30 | 0.0087 | 0.19 | 1.31 | ○ |
| Example 15 | A3 | 100 | 230 | B1 | 50 | 29 | 1.92 | 0.0082 | 0.19 | 1.62 | ○ |
| Comparative Example 1 | A1 | 100 | 260 | B1 | 50 | 3.0 | 1.23 | 0.0150 | 0.38 | 2.87 | ○ |
| Comparative Example 2 | A1 | 100 | 260 | B1 | 50 | 3.2 | 2.82 | 0.0134 | 0.37 | 2.85 | ○ |
| Comparative Example 3 | A1 | 100 | 260 | B1 | 50 | 6.1 | 1.37 | 0.0162 | 0.38 | 2.79 | ○ |
| Comparative Example 4 | A1 | 100 | 260 | B1 | 50 | 6.2 | 2.85 | 0.0132 | 0.40 | 2.90 | ○ |
| Comparative Example 5 | A1 | 100 | 260 | B7 | 50 | 9.3 | 1.19 | 0.0180 | 0.46 | 3.20 | X |
| Comparative Example 6 | A1 | 100 | 260 | B7 | 50 | 9.5 | 1.98 | 0.0193 | 0.44 | 3.27 | Δ |
| Comparative Example 7 | A2 | 100 | 237 | B1 | 50 | 3.0 | 1.24 | 0.0145 | 0.35 | 2.77 | ○ |
| Comparative Example 8 | A2 | 100 | 237 | B1 | 50 | 3.0 | 2.85 | 0.0126 | 0.34 | 2.81 | ○ |
| Comparative Example 9 | A2 | 100 | 237 | B1 | 50 | 6.1 | 1.35 | 0.0142 | 0.34 | 2.68 | ○ |
| Comparative Example 10 | A2 | 100 | 237 | B1 | 50 | 6.0 | 2.88 | 0.0130 | 0.35 | 2.85 | ○ |
| Comparative Example 11 | A2 | 100 | 237 | B7 | 50 | 9.4 | 1.20 | 0.0184 | 0.42 | 3.02 | X |
| Comparative Example 12 | A2 | 100 | 237 | B7 | 50 | 9.5 | 2.04 | 0.0183 | 0.40 | 3.12 | Δ |
| Comparative Example 13 | A4 | 100 | 307 | B1 | 50 | 3.1 | 2.00 | 0.0110 | 0.42 | 3.04 | ○ |

INDUSTRIAL APPLICABILITY

The reinforced polyamide resin pellet of the present invention has industrial applicability in the automobile field, the electrical and electronic field, the mechanical and industrial field, the office equipment field, the aerospace field, and the like.

The invention claimed is:

1. A reinforced polyamide resin pellet comprising:
   (A) a polyamide resin having a melting point of 210 to 265° C.; and
   (B) 50 to 120 parts by mass of at least one inorganic filler selected from the group consisting of chopped strand glass fibers, wollastonite, talc, mica, and kaolin, based on 100 parts by mass of the (A) polyamide resin, and
   wherein the pellet has a length of 1 to 5 mm and, when the pellet is cut on a plane perpendicular to the length direction of the pellet, the ratio of cross-sectional major axis to minor axis (major axis/minor axis) 1.3 to 2.5.

2. The reinforced polyamide resin pellet according to claim 1, wherein the (A) polyamide resin comprises a semi-aromatic polyamide.

3. The reinforced polyamide resin pellet according to claim 1, wherein the pellet has the ratio of a cross-sectional major axis to minor axis (major axis/minor axis) of 1.76 to 2.3.

4. The reinforced polyamide resin pellet according to claim 2, wherein the pellet has the ratio of a cross-sectional major axis to minor axis (major axis/minor axis) of 1.76 to 2.3.

5. The reinforced polyamide resin pellet according to claim 1, wherein (A) the polyamide resin comprises polyamide 66/6I.

6. The reinforced polyamide resin pellet according to claim 2, wherein (A) the polyamide resin comprises polyamide 66/6I.

7. The reinforced polyamide resin pellet according to claim 3, wherein (A) the polyamide resin comprises polyamide 66/6I.

8. The reinforced polyamide resin pellet according to claim 4, wherein (A) the polyamide resin comprises polyamide 66/6I.

9. A method for producing a reinforced polyamide resin pellet comprising:
   (A) a polyamide resin having a melting point of 210 to 265° C.; and
   (B) 50 to 120 parts by mass of at least one inorganic filler selected from the group consisting of chopped strand glass fibers, wollastonite, talc, mica, and kaolin, based on 100 parts by mass of the (A) polyamide resin, and
   wherein the pellet has a length of 1 to 5 mm and, when the pellet is cut on a plane perpendicular to the length direction of the pellet, the ratio of cross-sectional major axis to minor axis (major axis/minor axis) 1.3 to 2.5,
   the method comprising cooling a strand wherein a water immersion length of the strand in water is 90 cm or less.

* * * * *